United States Patent Office 3,542,586
Patented Nov. 24, 1970

3,542,586
RADIATION CURABLE PAINT CONTAINING A VINYL BINDER RESIN HAVING PENDANT MONOESTER GROUPS
Elihu J. Aronoff, Southfield, and Ernest O. McLaughlin, Detroit, Mich., assignors to Ford Motor Company, Dearborn, Mich., a corporation of Delaware
No Drawing. Filed July 1, 1968, Ser. No. 741,288
Int. Cl. C08f 15/10
U.S. Cl. 117—93.31        4 Claims

ABSTRACT OF THE DISCLOSURE

A radiation-curable paint comprising a vinyl monomeric component and a vinyl polymeric component having two or more monoester side chains of the following structural formula:

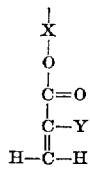

wherein X is a divalent radical and Y is a hydrogen or methyl radical, and a substrate painted therewith.

---

Painting a substrate with a film-forming liquid comprising a solution of olefinically unsaturated polymers in vinyl monomers and a method for effecting uniform cure of such film with an electron beam is described by W. J. Burlant in U.S. Pat. 3,247,012. This invention relates to novel, electron-curable, paints, particularly to the vinyl polymers used therein, and to their preparation and use.

The unique, alpha-beta olefinically unsaturated, polymers, hereinafter termed "binder resins," of this invention are the polymeric reaction product of an unsaturated acyl halide and vinyl polymers having free hydroxyl groups separated from carbon atoms of the principal carbon-to-carbon chain by a divalent alkyl radical. These binder resins are characterized by having pendant from carbon atoms of the principal carbon-to-carbon chain two or more monoester side chains of the following structural formula:

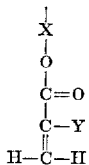

wherein X is a divalent alkyl radical and Y is a hydrogen or methyl radical.

The term "paint" is herein meant to include finely divided pigment and/or particulate filler in a film-forming, resin comprising, binder and the binder, which is ultimately converted to a weather and wear resistant film, can be all or virtually all that is used to form the film, or it can be a vehicle for pigmentary and/or particulate filler material.

The electron beams employed herein for polymerization, i.e., crosslinking the monomer-resin paint binder solutions, are advantageously the emission product of a cathode ray tube-type electron accelerator. Such beam preferably has an average energy of about 100,000 to about 450,000 electron volts.

The intermediate polymers from which the binder resins are prepared may be any film-forming copolymer of vinyl monomers having the requisite positioning of free hydroxyl groups. Such polymers are exemplified by copolymers of styrene and allyl alcohol, copolymers of cyclalol (the Diels-Alder reaction product of cyclopentadiene and allyl alcohol) styrene and/or acrylates and/or methacrylates, and copolymers of allyl alcohol and other vinyl monomers such as acrylonitrile.

At least a portion of the free hydroxyl groups of the polymer are reacted with an unsaturated acyl halide to yield a polymer having side chain terminal unsaturation and a structure corresponding to that hereinbefore illustrated. In a preferred embodiment, the amount of acyl halide used is sufficient to effect reaction of about 20% to about 95% of the available hydroxyl groups, varying within such range to correspond in inverse relationship with the concentration of such groups in the intermediate. The concentration of such hydroxyl groups in the intermediate is advantageously in the range of about 0.3 to about 7.0, preferably about 0.5 to about 3.0, per 1,000 units molecular weight. In some applications, it is advantageous to leave unreacted hydroxyl groups on the polymer to improve adhesion properties of the paint.

The vinyl resins have molecular weights in the range of about 800 to about 10,000 or higher, preferably in the range of about 1,000 to about 5,000 and have about 0.3 to about 5.0, preferably about 0.5 to about 3.0, alpha-beta olefinic unsaturation units per 1,000 units molecular weight. The amount of vinyl monomer used with such resins can be varied within the hereinafter stated ranges in accordance with the monomer or monomers used, the molecular weight of the resin, and with the concentration of alpha-beta olefinic unsaturation units therein.

The paint binder solutions contain about 10 to about 90, commonly about 30 to about 65, weight percent vinyl monomers on a pigment and/or particulate filler free basis. The vinyl monomer component may consist of a single compound or may be a mixture of two or more different monomeric compounds. Exemplary vinyl monomers include, but not by way of limitation, methyl methacrylate, ethyl acrylate, butyl acrylate, butyl methacrylate, styrene, acrylonitrile, methacrylonitrile, acrylic acid, methacrylic acid, etc.

The instant method for producing radiation sensitive paint binder resins is simple and selective. Control of the concentration of terminal unsaturation in the resin can be accurately calculated in advance. The paint binder resins thus produced exhibit excellent storage stability and curing properties.

The paint binders of this invention may be applied as liquid films to substrates by conventional means, e.g., spraying, roll coating, curtain coating, brushing, etc. The films applied will be commonly in the range of about 0.1 to about 4, more commonly 0.5 to 1.5 mils, average thickness.

The following examples are illustrative of the binder resins of this invention, the method of their preparation and use.

EXAMPLE 1

An electron-polymerizable paint is prepared from the following materials in the manner hereinafter set forth: 100 parts by weight of a styrene-allyl alcohol copolymer containing 21.4 weight percent allyl alcohol and having an average molecular weight of about 1,620 and 0.1 part by weight hydroquinone are dissolved in toluene and heated to 90° C. and 41.8 parts by weight of methacrylyl chloride in toluene added dropwise over a one-hour period. Heating is continued and the temperature allowed to rise to toluene reflux until essentially complete cessation of gas liberation is obtained after an additional five hours. Infrared analysis shows about 10% residual hydroxyl. The solvent is removed at the water pump.

A paint is prepared by admixing about 30 parts by weight of the above prepared paint binder resin, about 36 parts by weight methyl methacrylate, about 24.5 parts by weight mineral pigment and about 3.5 parts by weight carbon black and ground in a pebble mill until the pigment is uniformly dispersed. Additional methyl methacrylate, about 6 parts by weight, is added to bring the mixture to a good spraying viscosity. The paint is then sprayed upon a polymeric substrate to an average depth of about 1.5 mils and cured thereon with a cathode ray tube-generated electron beam in a nitrogen atmosphere. The conditions of irradiation are as follows:

Average beam energy—250 kev.
Current—25 milliamperes
Total dose—12.5 megarads

EXAMPLE 2

The procedure of Example 1 is repeated except that substrates of wood, aluminum, paper and glass are used.

EXAMPLE 3

The procedure of Example 1 is repeated except that films of about 0.3, 0.8, 2.0 and about 3.8 mils average depth are sprayed on the substrate and cured.

EXAMPLE 4

The procedure of Example 1 is repeated except that the methacrylyl chloride is replaced with equimolar amounts of acrylyl chloride.

EXAMPLE 5

The procedure of Example 1 is repeated except that the methyl methacrylate is replaced with a mixture of methyl methacrylate, styrene and butyl acrylate.

EXAMPLE 6

The procedure of Example 1 is repeated except that the methyl methacrylate is replaced with a mixture of styrene, ethyl acrylate, butyl methacrylate and methacrylic acid.

EXAMPLE 7

The procedure of Example 1 is repeated except that the methyl methacrylate is replaced with a mixture of methyl methacrylate, acrylic acid, acrylonitrile and butyl methacrylate.

The foregoing examples are solely for purposes of illustration and should not be considered as limitations upon the true scope of the invention as set forth in the following appended claims.

What is claimed is:

1. An article of manufacture comprising in combination a substrate and a coating of paint crosslinked upon an external surface of said substrate by applying a film-forming solution of paint to said surface and exposing the resultant paint film to an electron beam having average energy in the range of about 100,000 to about 450,000 electron volts, said film-forming solution of paint on a pigment and particulate filler free basis consisting essentially of
   (a) a polymeric component consisting essentially of a polymer formed by reacting a copolymer of styrene and allyl alcohol having average molecular weight in the range of about 800 to about 10,000 with an acyl halide selected from acrylyl chloride and methacrylyl chloride, said polymer containing between about 0.5 and 5 units of alpha-beta olefinic unsaturation per 1,000 units molecular weight essentially all of which are provided by monoester side chains connected to a carbon atom of the principal carbon-to-carbon chain and having the structural formula

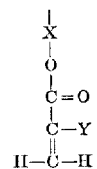

wherein X is a divalent alkyl radical and Y is hydrogen or methyl radical, and
   (b) a vinyl monomer component consisting essentially of vinyl monomers selected from styrene, esters of a $C_1$–$C_4$ monohydric alcohol and acrylic or methacrylic acid, acrylic acid, methacrylic acid, acrylonitrile and methacrylonitrile.

2. An article of manufacture in accordance with claim 1 wherein said vinyl monomers are a mixture of styrene and esters of a $C_1$–$C_4$ monohydric alcohol and acrylic or methacrylic acid, said copolymer has molecular weight in the range of about 1,000 and about 5,000 and said polymer has between about 0.5 and about 3 units of alpha-beta olefinic unsaturation per 1,000 units molecular weight.

3. An article of manufacture in accordance with claim 1 wherein said vinyl monomers are a mixture of esters of a $C_1$–$C_4$ monohydric alcohol and acrylic or methacrylic acid, said copolymer has molecular weight in the range of about 1,000 to about 5,000 and said polymer has between about 0.5 and about 3 units of alpha-beta olefinic unsaturation per 1,000 units molecular weight.

4. A paint comprising a film-forming solution which on a pigment and particulate filler free basis consists essentially of
   (a) a polymeric component consisting essentially of a polymer formed by reacting a copolymer of styrene and allyl alcohol having average molecular weight in the range of about 800 to about 10,000 with an acyl halide selected from acrylyl chloride and methacrylyl chloride, said polymer containing between about 0.5 and 5 units of alpha-beta olefinic unsaturation per 1,000 units molecular weight essentially all of which are provided by monoester side chains connected to a carbon atom of the principal carbon-to-carbon chain and having the structural formula

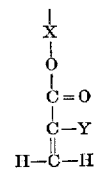

wherein X is a divalent alkyl radical and Y is hydrogen or methyl radical, and
   (b) a vinyl monomer component consisting essentially of vinyl monomers selected from styrene, esters of a $C_1$–$C_4$ monohydric alcohol and acrylic or methacrylic acid, acrylic acid, methacrylic acid, acrylonitrile and methacrylonitrile.

References Cited

UNITED STATES PATENTS 2,441,516  5/1948  Snyder _____ 260—884

OTHER REFERENCES

Hahn, Frank J.: Off. Dig., J. Paint Technol. Eng., October 1965, pp. 1251–1258.

Sullivan, Mary R.: Off. Dig., J. Paint Technol. Eng., October 1965, pp. 1279–1281.

SAMUEL H. BLECH, Primary Examiner

J. SEIBERT, Assistant Examiner

U.S. Cl. X.R.

117—124, 132, 148, 155, 161; 204—159.15; 260—41, 85.5, 88.1, 91.3, 875, 881, 885